United States Patent Office 3,732,223
Patented May 8, 1973

3,732,223
s-TRIAZINYL-ISOCYANATES
Ulrich von Gizycki and Günter Oertel, Cologne-Flittard, Germany, assignors to Bayer Aktiengesellschaft, Leverkusen, Germany
No Drawing. Filed Aug. 18, 1970, Ser. No. 64,814
Claims priority, application Germany, Aug. 28, 1969, P 19 43 635.2
Int. Cl. C07d 55/50
U.S. Cl. 260—249.8    8 Claims

ABSTRACT OF THE DISCLOSURE s-Triazinyl mono- and di-isocyanates are prepared, the latter compounds being new compositions, by a process which comprises reacting s-triazinyl mono- and di-amines with oxalyl chloride. The s-triazinyl isocyanates are particularly useful as precursors in the manufacture of polyurethane resins.

---

The present invention relates to s-triazinyl isocyanates and more particularly to a process for the preparation of s-triazinyl mono- and diisocyanates and the use of s-triazinyl-diisocyanates in the preparation of polyurethane resins.

References in the literature describing isocyanates in which the NCO group is directly attached to a triazine ring are quite sparse. The work of E. F. J. Duynstee in R. 80, 563 (1961), for example suggests that intermediate formation of 2,4-diphenyl-s-triazine-6-isocyanate probably occurs as a result of trapping reactions (urethane and urea formation) in the decomposition of the corresponding acid azide. The isocyanate itself could not be isolated. Y. Kodoma and T. Sekiba in J. Soc. Org. Synth. Chem. Japan 21, 888 (1963), describes 2,4 - dichloro-s-triazine-6-isocyanate as a very reactive compound which they have obtained from tetrameric cyanogen chloride according to the following reaction mechanism.

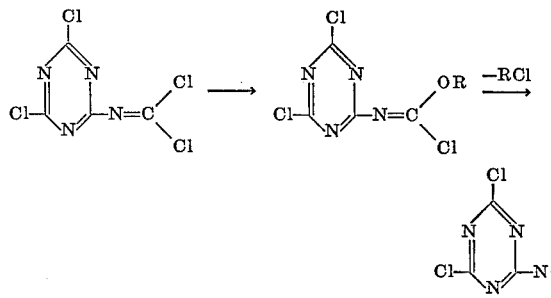

wherein R is $CH_3$ or $C_2H_5$.

The foregoing synthesis of 2,4-dichloro-s-triazine-6-isocyanate forms the subject matter of Japanese patent specification No. 11,389/65.

The probable reason why the description or preparation of s-triazinyl-isocyanates have up to now received little mention in the literature appears to be that the usual method for the preparation of isocyanates, namely phosgenation of the corresponding amines, fails when applied to amino-s-triazines.

It is therefore an object of this invention to provide heretofore unknown s-triazinyl diisocyanate compounds. Another object of this invention is to provide a method for preparing both s-triazinyl mono- and di-isocyanates.

The foregoing objects and others are accomplished according to the invention, generally speaking, by reacting an s-triazinyl mono- or di-amine with at least about one mol and preferably from about 1.5 to about 2.5 mols of oxalyl chloride per amino group, at a temperature of from about 0° C. to about 250° C., more preferably at from about 40° C. to about 180° C. and most preferably at from about 40° C. to about 140° C. The formation of the corresponding s-triazinyl isocyanates from their respective s-triazinyl amines proceeds suprisingly smooth, generally in accordance with the following reaction mechanisms, which reactions may, if desired, be carried out in the presence of inert organic solvents, such as, for example benzene, toluene, or chlorobenzene or under pressure or both.

(A) Preparation of s-triazinyl monoisocyanate

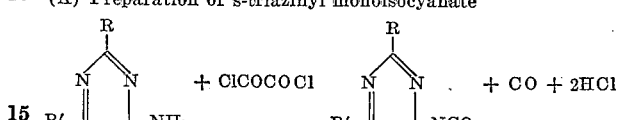

(B) Preparation of s-triazinyl diisocyanate

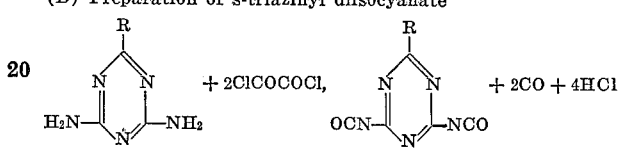

wherein R and R' are the same or different radicals having 1–12 carbon atoms selected from the group consisting of alkyl, chloroalkyl, fluoroalkyl, bromoalkyl, iodoalkyl, nitroalkyl, alkaryl, alkyl-mercapto, alkylcarbonyl, chloroalkylcarbonyl, fluoroalkyl-carbonyl, bromoalkyl carbonyl, iodoalkylcarbonyl, nitroalkylcarbonyl, cyanoalkylcarbonyl, alkylcarbonyl, alkoxyalkylcarbonyl, alkylmercaptoalkylcarbonyl, carbalkoxyalkylcarbonyl, alkoxycarbonyl, alkoxyalkylcarbonyl, aryloxyalkylcarbonyl, aryl, chloroaryl, fluoroaryl, bromoaryl, iodoaryl, nitroaryl, cyanoaryl, alkoxyaryl, alkylmercaptoaryl, carbalkoxyaryl, arylmercapto, arylcarbonyl, chloroarylcarbonyl, fluoroarylcarbonyl, bromoarylcarbonyl, iodoarylcarbonyl, nitroaryl-carbonyl, cyanoarylcarbonyl, alkoxyarylcarbonyl, alkylmercaptoarylcarbonyl, carbalkoxyarylcarbonyl, alkoxyarylcarbonyl, aryloxycarbonyl, aryloxyarylcarbonyl, cyano or nitro, chlorine, fluorine, bromine, iodine or hydrogen.

However, any s-triazinyl mono- or di-amines corresponding to the above formulae are suitable starting materials according to the process of the invention as the precise definition of the radical group designated R resp. R' are not material to the workings of the invention. The R or R' groups do not in any manner enter into the reaction and, as is evident from reactions (A) and (B), R and R' are determined solely by the choice of the starting s-triazinyl-amine.

Any suitable s-triazinyl monoamine is used as a starting material according to the process of the invention, some preferred examples of which are 2,4-dimethyl-6-amino-s-triazine,
2,4-diethyl-6-amino-s-triazine,
2,4-dibutyl-6-amino-s-triazine,
2,4-dihexyl-6-amino-s-triazine,
2,4-diisopropyl-6-amino-s-triazine,
2,4-bis-trichloromethyl-6-amino-s-triazine,
2,4-bis-trichlorobutyl-6-amino-s-triazine,
2,4-bis-difluoroethyl-6-amino-6-triazine,
2,4-bis-dibromomethyl-6-amino-s-triazine,
2,4-bis-triiodo-isopropyl-6-amino-s-triazine,
2,4-dinitro-6-amino-s-triazine,
2,4-dimethoxy-6-amino-s-triazine,
2,4-dibutoxy-6-amino-s-triazine,
2,4-diethyl mercapto-6-amino-s-triazine,
2,4-dicarboethoxyl-6-amino-s-triazine,
2,4-diphenyl-6-amino-s-triazine,
2,4-bis-(p-chlorophenyl)-6-amino-s-triazine,
2,4-bis-(p-bromophenyl)-6-amino-s-triazine, 2,4-bis-(m-dicarbomethoxyphenyl)-6-amino-s-triazine,
2-methyl-4-ethyl-6-amino-s-triazine,
2-trichloromethyl-4-chloro-6-amino-s-triazine and the like.

Any suitable s-triazinyl diamine can be used as a starting material according to the process of the invention, some preferred examples of which are 2,4-diamino-s-triazine,
4-methyl-2,6-diamino-s-triazine,
4-ethyl-2,6-diamino-s-triazine,
4-isopropyl-2,6-diamino-s-triazine,
4-hexyl-2,6-diamino-s-triazine,
4-chloro-2,6-diamino-s-triazine,
4-trichloromethyl-2,6-diamino-s-triazine,
4-trifluoroethyl-2,6-diamino-s-triazine,
4-triiodoisopropyl-2,6-diamino-s-triazine,
4-nitro-2,6-diamino-s-triazine,
4-cyano-2,6-diamino-s-triazine,
4-methoxy-2,6-diamino-s-triazine,
4-butoxy-2,6-diamino-s-triazine,
4-methyl mercapto-2,6-diamino-s-triazine,
4-ethoxycarbonyl-4-phenyloxycarbonyl-2,6-diamino-s-triazine,
2,6-diamino-s-triazine,
4-phenyl-2,6-diamino-s-triazine,
4-chlorophenyl-2,6-diamino-s-triazine,
4-fluorophenyl-2,6-diamino-s-triazine,
4-methoxyphenyl-2,6-diamino-s-triazine,
4-butoxyphenyl-2,6-diamino-s-triazine,
4-phenylmercapto-2,6-diamino-s-triazine,
4-carboethoxyphenyl-2,6-diamino-s-triazine,
4-methylmercapto-2,6-diamino-s-triazine and the like.

The mono- resp. diamino-s-triazines used as starting materials can be obtained according to various methods as e.g. described in Annalen der Chemie, 376 (1910), page 163; Berichte der Deutschen Chemischen Gesellschaft, 25 (1892), page 539; 32 (1899), page 695; 20 (1887), page 2240; 102 (1969), page 2330; Gazetta Chimica Italiana, 60 (1930), page 648; or 62 (1932), page 317.

The reaction is very simple to carry out since as a rule the starting materials merely have to be mixed together and heated under reflux until evolution of gas ceases. Pure s-triazinyl-isocyanate can then easily be obtained by distillation of the reaction mixture.

s-Triazinyl-monoisocyanates prepared by the process of the invention, as illustrated by reaction mechanism (A), are generally colorless, crystalline compounds which are very sensitive to atmospheric moisture owing to their extremely high reactivity.

s-Triazinyl-diisocyanates prepared by the process of the invention, as illustrated by reaction mechanism (B), are representative of a class of compounds not heretofore known or prepared. They are generally stable, liquid or crystalline, colorless products which, as s-triazinyl-monoisocyanates, are very sensitive to atmospheric moisture.

The s-triazinyl-diisocyanate compounds prepared by the process of the invention are particularly suitable for the preparation of polyurethanes by the well-known isocyanate polyaddition process, which process is e.g. described in detail in Kunststoff-Handbuch, Vol. VII, Polyurethane, Carl-Hanser-Verlag, Munich 1966, since they are more reactive by at least a power of 10 than the diisocyanates customarily used for the preparation of polyurethanes, such as, for example 2,4- and 2,6-diisocyanato-toluene, 4,4-diisocyanato-diphenylmethane, hexamethylene-1,6-diisocyanate, and the like.

Thus, it is possible to prepare, for example, polyurethanes of bifunctional or higher functional hydroxyl such as, for example compounds which, under normal conditions, are inactive with the diisocyanate customarily used. In addition to the above uses, both s-triazinyl-mono- and diisocyanates are suitable for the preparation of optical brightening agents and dyes; as reactive components for dyes and as intermediate products for the preparation of plant protective agents and pharmaceuticals.

The invention is further illustrated, but it is not intended that it be limited by the following examples in which all parts are by weight except as otherwise indicated.

EXAMPLE 1

Preparation of 2,4-dichloro-6-isocyanato-s-triazine

About 60 parts of finely powdered 2,4-dichloro-6-amino-s-triazine are suspended in about 500 parts by volume of anhydrous toluene and about 130 parts of oxalyl chloride and heated under reflux for about 10 hours until evolution of gas has ceased. After removal of the solvent and excess oxalyl chloride by distillation, the residue is distilled under vacuum. B.P.: 105–106° C./10–12 mm. Hg. The product solidifies in the receiver.

Yield: About 60 parts of colorless crystals
M.P. 66–67° C.
Molecular weight determined by mass spectroscopy: 190
Theoretical: 190 (with Cl=35)

The active halogens react in the determination of NCO by titration with n-butylamine.

EXAMPLE 2

Preparation of 2,4-bis-trichloromethyl-6-isocyanato-s-triazine

About 300 parts of finely powdered 2,4-bis-trichloromethyl-6-amino-s-triazine are heated under reflux for about 18 hours in a mixture of 2000 parts by volume of anhydrous toluene and about 350 parts of oxalyl chloride until evolution of gas ceases. After removal of solvent and excess oxalyl chloride by distillation, the brown oil remaining behind is distilled under high vacuum. The isocyanate slowly solidifies in the receiver.

B.P.: 134–135° C./0.2–0.3 mm. Hg
M.P. 54–56° C.
Yield: About 200 parts of colorless, light-sensitive crystals
Molecular weight determined by mass spectroscopy: 354
Theoretical: 354 (with Cl=35)
NCO: Calculated: 8.5%. Found: 9.5%.

EXAMPLE 3

Preparation of 4-chloro-s-triazinyl-2,6-diisocyanate

A mixture of about 900 parts by volume of anhydrous chlorobenzene, about 250 parts of oxalyl chloride and about 100 parts of finely powdered 4-chloro-2,6-diamine-s-triazine is heated for about 10 hours under reflux and is then left to cool. The small amount of colorless precipitate (about 3 to about 5 parts) is removed by suction filtration and the filtrate is concentrated by evaporation under vacuum. The crude product is then distilled in a high vacuum.

B.P. 0.2 mm.: 84–85° C.
Yield: About 86 parts of 4-chloro-s-triazinyl-2,6-diisocyanate as colorless liquid
Molecular weight determined by mass spectroscopy: 197
Theoretical: 197 (with Cl=35)

NCO: Calculated: 42.5%. Found: 45.8%.

In the titration with n-butylamine, the halogen participates to some extent in the reaction. The product solidifies in the receiver in crystalline form or gradually in a glassy amorphous form and is very sensitive to water.

EXAMPLE 4

Preparation of 4-trichloromethyl-s-triazinyl-2,6-diisocyanate

About 47 parts of 4 - trichloromethyl - 2,6 - diamino-s-triazine are suspended in a mixture of about 500 parts by volume of anhydrous toluene and about 100 parts of oxalyl chloride and boiled under reflux for about 7 hours.

The solvent is then drawn off under vacuum and the residue is distilled off in a high vacuum.

B.P. 0.9 mm.; 126–127° C.

Yield: About 28 parts of 4-trichloromethyl-s-triazinyl-2,6-diisocyanate as colorless liquid.

Molecular weight determined by mass spectroscopy: 279
Theoretical: 279 (with Cl=35)
NCO content: Calculated: 30.1%. Found: 30.3%

EXAMPLE 5

Preparation of 4-phenyl-s-triazinyl-2,6-diisocyanate

About 25 parts of 4-phenyl-2,6-diamino-s-triazine are suspended in a mixture of about 500 parts by volume of anhydrous toluene and about 50 parts of oxalyl chloride and boiled under reflux for about 9 hours. The colorless precipitate, amounting to about 5 parts is removed by suction filtration and the filtrate is concentrated by evaporation under vacuum and the residue is distilled in a high vacuum.

B.P. 0.1 mm.: 142° C.

Yield: About 20 parts of 4-phenyl-s-triazinyl-2,6-diisocyanate as colorless crystals Molecular weight determined by mass spectroscopy: 239
Theoretical: 239
NCO content: Calculated: 35.1%. Found: 34.5%

Preparation of a polyurethane from a polyester

A mixture of about 50 parts by volume of toluene and about 100 parts of a polyester of adipic acid and diethylene glycol of OH number 42 is added at about 60° C. to a solution of about 9 parts of 4-phenyl-s-triazinyl-2,6-diisocyanate in about 250 parts by volume of distilled toluene. The solvent is removed under vacuum after about one hour. A colorless, rubbery, soft polyurethane remains behind.

Preparation of a polyurethane from a bisphenol

A solution of about 2.3 parts of 2,2-(4,4'-dihydroxydiphenyl)-propane in about 75 parts by volume of anhydrous methylene chloride is added to a solution of about 2.5 parts of 4-phenyl-s-triazinyl-2,6-diisocyanate in about 75 parts by volume of anhydrous methylene chloride and the mixture is then heated under reflux for about 15 minutes. After filtration and removal of the solvent by evaporation, a colorless, solid polyurethane remains behind.

Although the invention has been described in considerable detail by the foregoing it is to be understood that such detail is solely for the purpose of illustration and that many variations can be made by those skilled in the art without departing from the spirit and scope of the invention.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. s-Triazinyl-diisocyanate having the formula:

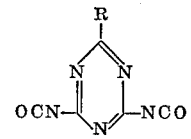

wherein R is selected from the group consisting of hydrogen, halogen, nitro, cyano, alkyl, alkyl mercapto, alkyloxycarbonyl, alkoxy, aryl, aryl mercapto, aryloxycarbonyl and aryloxy, the alkyl moiety containing from 1 to 12 carbon atoms and the aryl moiety is phenyl.

2. The s-triazinyl-diisocyanate of claim 1 wherein R is a chlorine atom.

3. The s-triazinyl-diisocyanate of claim 1 wherein R is a trichloro methyl radical.

4. The s-triazinyl-diisocyanate of claim 1 wherein R is a phenyl radical.

5. A process for preparing s-triazinyl isocyanates which comprises reacting at a temperature of from about 0° C. to about 250° C., an s-triazinyl mono- or di-amine with from about 1.5 to about 2.5 mols of oxalyl chloride per amino group present.

6. The process of claim 5 wherein the reaction is carried out in the presence of an inert organic solvent.

7. The process of claim 5 wherein the reaction is carried out under pressure.

8. The process of claim 5 wherein the temperature is from about 40° C. to about 140° C.

References Cited

UNITED STATES PATENTS 2,340,757   2/1944   Kaase et al. _____ 260—248
2,864,820   12/1958   Sheers et al. _____ 260—248

JOHN M. FORD, Primary Examiner

U.S. Cl. X.R.

260—249.9, 77.5 AT